United States Patent Office 3,445,209
Patented May 20, 1969

3,445,209
METHOD FOR INITIATING AND CONTROLLING CRYSTALLIZATION OF GLASS
Saara K. Asunmaa, Laguna Beach, Calif., assignor to Owens-Illinois, Inc., a corporation of Ohio
No Drawing. Filed Oct. 20, 1965, Ser. No. 499,039
Int. Cl. C03b *31/00, 5/16*
U.S. Cl. 65—33                                                    5 Claims

ABSTRACT OF THE DISCLOSURE

A method for initiating and controlling the crystallization of a glass body of the $SiO_2$—$Al_2O_3$—$TiO_2$ system, which body is free of photosensitive substances, by subjecting the body at an elevated temperature of at least 300° C., to gamma rays, ultraviolet rays, or X-rays for at least one hour to initiate nucleation and obtain crystallization of the glass.

---

The present invention relates to a method for initiating nucleation and controlling the devitrification of glass whereby it is possible to introduce certain desirable characteristics into the treated glass to obtain a desired product.

Glass is usually devitrified by heat treatment schedule whereby the glass is subjected to the nucleation temperature range and thereafter to the crystallization temperature range to obtain in situ thermal crystallization of the glass. The addition of energy by heat treatment affects the mobility of the ions, atoms and molecules in the glass structure. It has been determined that the increased mobility of the heated particles in a material in the disordered glassy state accelerates the conversion of the glass into a highly oriented and ordered crystalline state. Generally, there is an optimum thermal treatment for conversion of the material from the glassy into the crystalline state above and below which the transition is slower or even negligible and such optimum conditions can be readily determined by appropriate experimentation.

The energy absorbed causes changes in the viscosity, mobility and diffusion of the various components in the glass and may also cause chemical reactions and physical rearrangements as crystallization of the components may lead to new states corresponding to the energy available.

Accordingly, it is an object of the present invention to provide a method for initiating nucleation and controlling the devitrification of glass in order to obtain a product wherein the amount of crystallization achieved in the product is a function of the amount of energy introduced into the system.

It is a further object of the present invention to provide a method for initiating nucleation and controlling the devitrification of glass by utilization of a non-thermal treatment which enables the more precise achievement of any desired amount or depth of crystallization in a glass body.

In attaining the above objects, one feature of the present invention resides in exposing a glass body to radiant excitation energy sufficient to initiate nucleation and an amount sufficient to obtain a desired amount or depth of crystallization in the glass body.

A further feature of the present invention resides in the use of gamma rays, ultraviolet rays and X-rays for the initiation of nuclei which serve as centers for crystallization of glass.

The above, as well as other objects, features and advantages of the present invention will become apparent from the following detailed description thereof.

It has been observed that high energy radiation produces discoloration in crystals and in glasses. It is believed that the changes in the optical properties of the glasses are caused by rearrangement in the molecular configuration of the glass. As a consequence certain structural dissymmetry centers are produced. These dissymmetry centers originate nuclei formation as well as do chemically foreign components. The rate of formation of the dissymmetry centers is believed to be propertional to the amount of excitation energy obtained and is influenced by the energy density which means that the energy range of the employed radiation and the dosage per unit time have certain influence on the rate of formation of dissymmetry and nuclei sites. At high temperatures, the effect of radiation induced dissymmetry centers is emphasized and maximized inasmuch as it increases the mobility of the components and therefore may cause local concentration of non-equilibria. Care must, nevertheless, be exercised since, if the temperature is too high, the stored energy may dissipate in thermal vibrations at a higher rate than at low temperatures thus causing a tendency to return to the original molecular configuration.

It has been observed to a certain extent that nucleation initiated in accordance with the present invention exhibits a tendency to formation of more uniform particle size and a more uniform distribution throughout the sample than do thermally treated blank samples. Since the average crystal size is correlated to the strength properties of the crystallized ceramic, the initiation and controlled crystallization by radiation is particularly useful for imparting any desired amount of strength in crystalline ceramics. The method of the present invention permits the depth of crystalline formation to be readily varied and thereby provides an efficient means for controlling the strength of the resulting article.

In accordance with the present invention radiant energy in the form of gamma rays, ultraviolet rays and X-rays may be used for the initiation of nucleation. For purposes of illustrating the present invention a glass of the following composition was subjected to X-rays.

|            | Percent |
|------------|---------|
| BaO        | 35      |
| $Al_2O_3$  | 13.2    |
| $TiO_2$    | 12.3    |
| $SiO_2$    | 39.5    |

Two types of X-ray radiation were employed for purposes of the test. Iron-K and Nickel-K from a metal foil bombarded with 50 kv. electrons and Cu-K from an X-ray unit. A second specimen of glass of the following compositions was also tested.

|           | Percent |
|-----------|---------|
| $SiO_2$   | 70.2    |
| $Al_2O_3$ | 17.5    |
| MgO       | 2.6     |
| $TiO_2$   | 4.7     |
| $Li_2O$   | 2.9     |
| ZnO       | 0.7     |
| $ZrO_2$   | 0.3     |
| $NaAsO_3$ | 1.0     |

The samples were maintained at temperatures of 340° C. and 430° C., respectively, for 9 hours. Temperatures of 500° C., 550° C. and 600° C. were selected for the experiments with the Copper-K radiation.

An increased and rather uniform nucleation was observed in the irradiated samples, particularly in the barium-containing glass. Electron diffraction studies indicated distinct formation of single crystal patterns on the surface of the irradiated glass samples. Moreover, the specimens show clearly single crystal diffraction patterns in transmission. The baria glass was irradiated at 340° C. from a Fe-Ni target for 9 hours in a RCA electron microscope. Very complete nucleation in crystal growth was obtained. The remaining samples of baria glass were irradiated at 500° C. for 10 hours, 500° C. for 3 hours, 550° C. for 16.6 hours and in each instance very complete and thorough nucleation was observed.

It will be manifest that the methods of the present invention for initiation of nucleation and montrol of crystallization can be carried out with any crystallizable glass composition, particularly those containing $TiO_2$ and lithium.

Glasses encompassed within the following formulation can be treated in accordance with the present invention. The essential components listed below are present in the glass in the weight percent limits indicated based on the weight of the total composition:

| Component: | Weight percent |
|---|---|
| $SiO_2$ | 35–72 |
| $Al_2O_3$ | 10–18 |
| $Li_2O$ | 0–5 |
| $MgO$ | 0–5 |
| $ZrO_2$ | 0–2 |
| $TiO_2$ | 1.2–15 |
| $P_2O_5$ | 0–2 |
| $BaO$ | 0–40 |
| $ZnO$ | 0–2 |

It will be further manifest that any number of additional ingredients can also be utilized in accordance with the present invention. In addition, small amounts of residual arsenic and antimony oxides are often present in the composition since arsenic and antimony are often used as fining or oxidizing agents. The glasses are free of photosensitive substances.

It will be understood that the optimum radiant excitation energy treatment depends on the particular glass composition and its tendency to form nuclei, the rate of nuclei formation and the rate of crystallization. Therefore, it is not possible to specify a radiant energy treatment that will be common to all the glasses encompassed by the present invention. While the best radiation treatment range for maximum nuclei formation is difficult to measure directly, the optimum treatment range can be empirically determined employing small droplets of the glass and accurate control of radiation.

The process of the invention usually comprises shaping the glass into the desired article which can be in the shape of film, table ware such as pie plates, dinner plates, serving pieces, cooking ware and the like, and thereafter subjecting the article to radiant excitation energy at elevated temperature. The range of temperatures wherein the process is carried out generally runs up to about 600° C. and down to approximately 300° C. and the time period may vary widely as, for example, from 1 to 20 hours. It will be understood, of course, that this range can be extended in either direction. The length of time of the radiation treatment is a function of the composition at the rate of nuclei and crystal formation and can be determined by experimentation in any suitable manner. There is nothing narrowly critical about the temperature range. It will be understood that at higher temperatures, the rate of crystallization will be greater than at lower temperatures. The depth of the crystallized layer will depend on the intensity of the radiation as mentioned previously, hence, it is possible to completely devitrify a product or only to partially devitrify a product depending on the depth of crystallization desired.

The products of the radiation treatments of the present invention are called crystalline, ceramics or crystalline ceramics and they are at least partially crystalline in nature. They have a porosity of zero and contain a multiplicity of randomly oriented crystals.

It is understood that various other modifications will be apparent to and can readily be made by those skilled in the art without departing from the scope and spirit of this invention. Accordingly, it is not intended that the scope of the claims appended hereto be limited to the description set forth herein but rather that the claims be construed as encompassing all the features of patentable novelty which reside in the present invention including all features which would be treated as equivalents thereof by those skilled in the art to which the invention pertains.

What is claimed is:

1. A method for initiating and controlling the crystallization of a glass body free of photosensitive substances wherein the essential components listed below are present in the glass body in the weight percent limit indicated based on the weight of the total composition:

| Component: | Weight Percent |
|---|---|
| $SiO_2$ | 35–72 |
| $Al_2O_3$ | 10–18 |
| $Li_2O$ | 0–5 |
| $MgO$ | 0–5 |
| $ZrO_2$ | 0–2 |
| $TiO_2$ | 1.2–15 |
| $P_2O_5$ | 0–2 |
| $BaO$ | 0–40 |
| $ZnO$ | 0–2 | which comprises subjecting the said body while at an elevated temperature of at least 300° C. to radiant excitation energy selected from the group consisting of gamma rays, ultraviolet rays and X-rays for at least one hour to initiate nucleation and obtain crystallization of the glass.

2. A method for initiating and controlling the crystallization of a glass body free of photosensitive substances wherein the essential components listed below are present in the glass body in the weight percent limits indicated based on the weight of the total composition:

| Component: | Weight Percent |
|---|---|
| $SiO_2$ | 35–72 |
| $Al_2O_3$ | 10–18 |
| $Li_2O$ | 0–5 |
| $MgO$ | 0–5 |
| $ZrO_2$ | 0–2 |
| $TiO_2$ | 1.2–15 |
| $P_2O_5$ | 0–2 |
| $BaO$ | 0–40 |
| $ZnO$ | 0–2 | which comprises subjecting said glass body while at a temperature of at least 300° C. up to 600° C. to radiant excitation energy selected from the group consisting of gamma rays, ultraviolet rays and X-rays for a time of at least 1 hour up to 20 hours to initiate nucleation and obtain crystallization of the glass.

3. The method as defined in claim 1 wherein the crystallization produced is a portion of the total thickness of the glass body.

4. The method as defined in claim 1 wherein the glass has the following composition:

| | |
|---|---|
| $BaO$ | 35.0 |
| $Al_2O_3$ | 13.2 |

| | |
|---|---|
| TiO$_2$ | 12.3 |
| SiO$_2$ | 39.5 |

5. The method as defined in claim 1 wherein the glass has the following composition:

| | |
|---|---|
| SiO$_2$ | 70.2 |
| Al$_2$O$_3$ | 17.5 |
| MgO | 2.6 |
| TiO$_2$ | 4.7 |
| Li$_2$O | 2.9 |
| ZnO | 0.7 |
| ZrO$_2$ | 0.3 |
| NaAsO$_3$ | 1.0 |

References Cited

UNITED STATES PATENTS

| | | | |
|---|---|---|---|
| 2,515,407 | 7/1950 | Stookey | 65—33 XR |
| 3,161,528 | 12/1964 | Eppler | 65—33 XR |
| 3,173,850 | 3/1965 | Hood | 65—33 XR |
| 3,282,711 | 11/1966 | Lin | 65—33 XR |
| 2,515,943 | 7/1950 | Stookey | 65—33 XR |
| 3,232,926 | 6/1967 | O'Leary | 65—33 XR |

DONALL H. SYLVESTER, *Primary Examiner.*

F. W. MIGA, *Assistant Examiner.*

U.S. Cl. X.R.

65—30; 204—157.1